June 28, 1960 P. B. WEISZ 2,943,040
HYDROCARBON CONVERSION PROCESS
Filed June 1, 1956 2 Sheets-Sheet 2
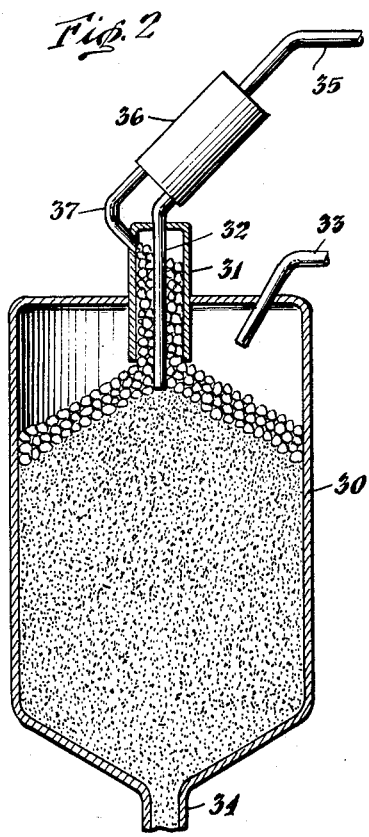
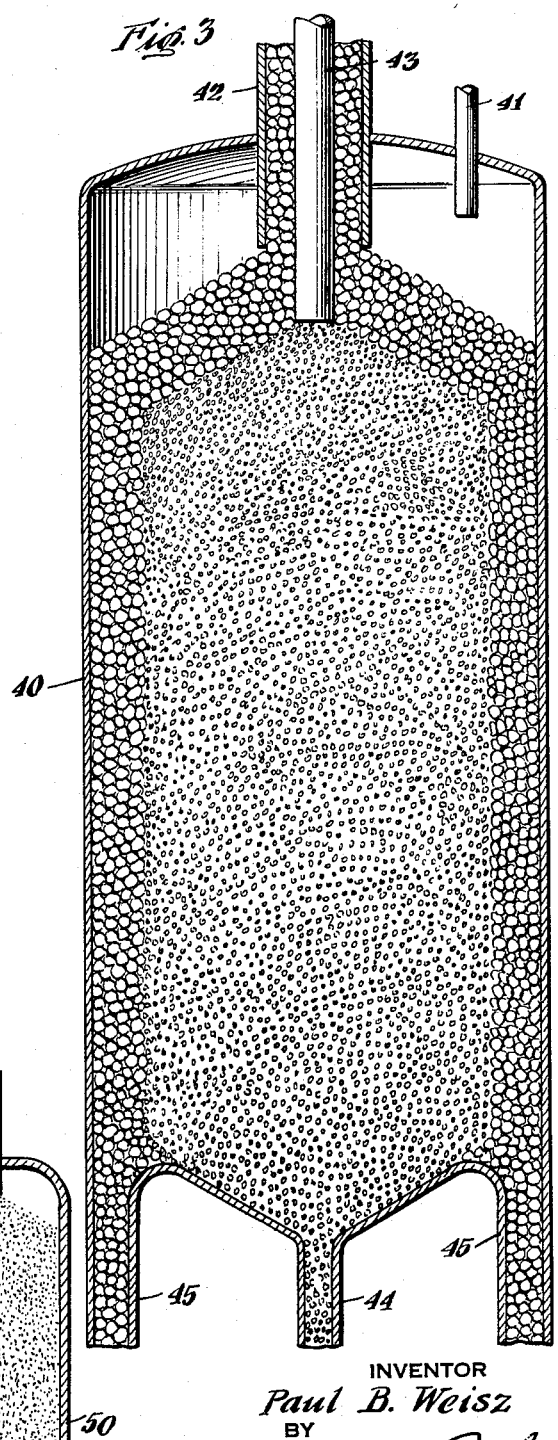
INVENTOR
Paul B. Weisz
BY
Raymond W. Barclay
ATTORNEY United States Patent Office 2,943,040
Patented June 28, 1960

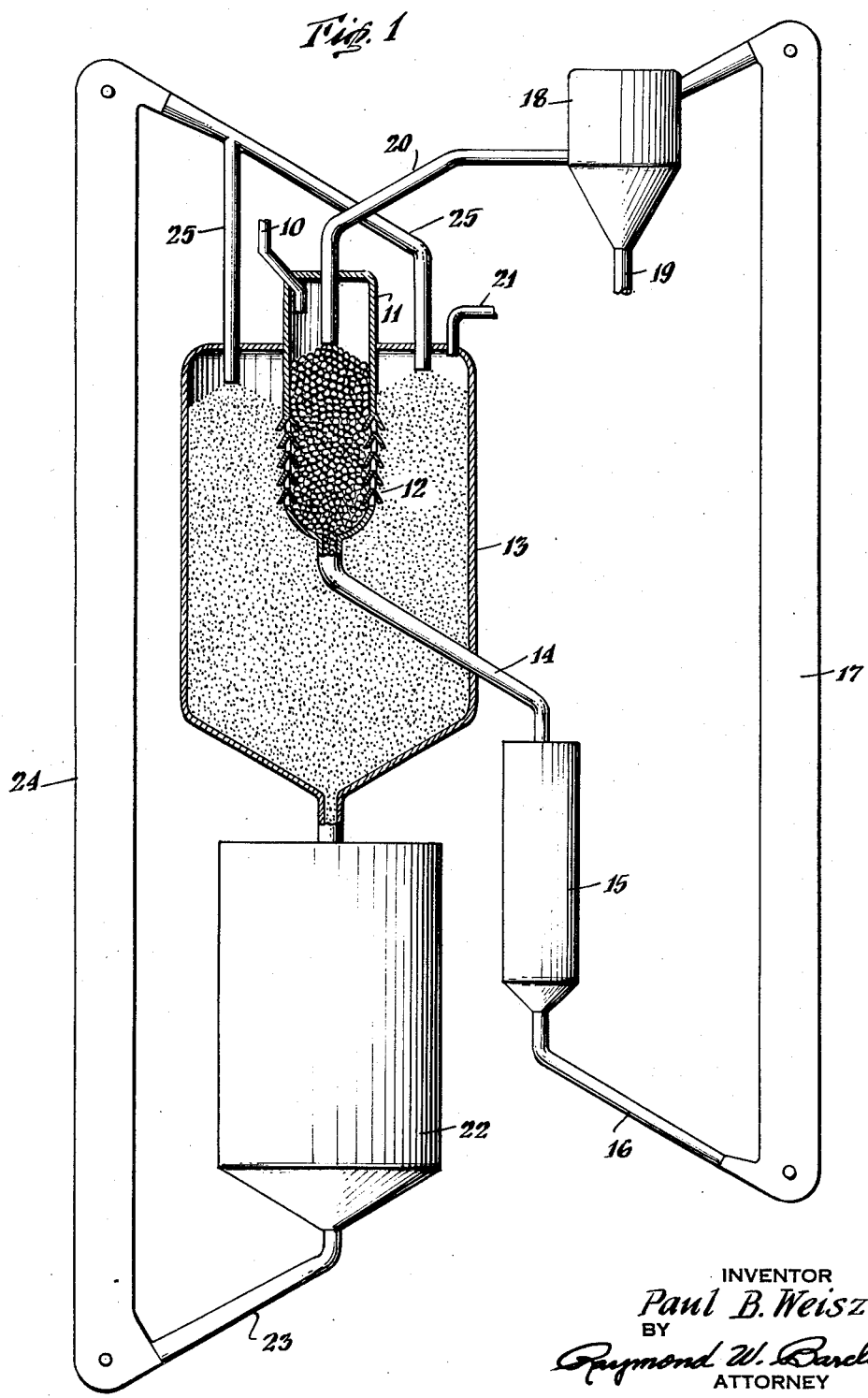

2,943,040

HYDROCARBON CONVERSION PROCESS

Paul B. Weisz, Pitman, N.J., assignor to Socony Mobil Oil Company, Inc., a corporation of New York Filed June 1, 1956, Ser. No. 588,818

3 Claims. (Cl. 208—91)

This invention relates to catalytic conversion of hydrocarbons and is concerned particularly with operations in which cracking catalysts are employed, such as the cracking of higher boiling hydrocarbons to lower boiling hydrocarbons, for example, those of gasoline boiling range. More specifically, the present invention is directed to an improvement in catalytic cracking which minimizes the effect of catalyst contaminants introduced by the feed stocks and which normally accumulate on the catalyst surface as the conversion process proceeds.

Processes of catalytic conversion of the type to which this invention pertains are well known in the art. Thus, in the catalytic cracking of petroleum hydrocarbons, a solid, porous adsorbent catalyst is contacted with hydrocarbon charge in vapor, liquid, or mixed phase at conversion conditions, for example, 800° F. to 1200° F. at atmospheric or greater pressures. The reaction which takes place is essentially cracking to produce lighter hydrocarbons but is accompanied by a number of complex side reactions, such as polymerization, aromatization, alkylation, and the like. As a result of these complex side reactions, a quantity of hydrocarbon gases and a carbonaceous deposit is laid down on the catalyst which is commonly called coke, although it contains considerable hydrogen and is probably a highly condensed hydrocarbon. The coke tends to seriously impair the catalytic efficiency of the catalyst for the principal reaction and the conversion reaction is thereafter suspended after coke, to the extent of a few percent by weight, has accumulated on the catalyst. The catalytic surface is then regenerated by burning the coke in a stream of oxidizing gas and the catalyst is returned to the conversion stage of the cycle. As will be realized, the formation of coke represents a net loss since hydrocarbons are consumed in its production. In addition, it is apparent that the greater the coke deposit the longer the regeneration period would have to be in proportion to the on-stream period in order not to exceed detrimental temperature levels during regeneration.

In carrying out a cracking operation with alternate conversion and regeneration as above-described, the catalyst gradually deteriorates so that a progressively larger proportion of the oil feed is converted into coke and gas for a given yield of gasoline, i.e., the ratio of the amount of coke and gas to the amount of gasoline produced from a given amount of feed oil increases as a result of the catalyst deterioration. Such deterioration is due, at least in part, to the gradual accumulation on the catalyst of inorganic contaminant deposited from the hydrocarbon charge stock. Such contaminant generally consists of high molecular weight materials including heavy metal compounds, porphyrins, and the like. For example, very small amounts of ash-forming metallic constituents, such as iron, nickel, vanadium, and copper are detrimental to the type of catalysis desired in cracking. These metallic constituents, being non-combustible, are not removed during the regeneration treatment and therefore tend to build up on the catalyst as the process continues to such point that further contact of the cracking charge with the catalyst becomes an uneconomical operation. It would appear that the catalyst contaminant or poison is due to the presence of oil-soluble metallic compounds in the charge stock. Such impurities may be inherently contained in the charge stock or may be conversion products resulting from the reaction of naphthenic and other organic acids normally present in the feed oil on the metal equipment which comes in contact with the oil. Regardless of its manner of introduction, the presence of such contaminant on the cracking catalyst employed is definitely detrimental, leading to decreased activity and to the production of an excessive amount of coke.

It is a major object of this invention to overcome the difficulties caused by the presence of inorganic contaminant in the hydrocarbon oil charged to a catalytic cracking operation. A further object is to provide a catalytic cracking process wherein the poisoning effects of metallic constituents on the conversion efficiency of the cracking catalyst are minimized. A still further object is the provision of an improved commercially attractive hydrocarbon conversion process in which the hydrocarbon charge coming into contact with active cracking catalyst is substantially free of contaminant detrimental to such catalyst.

The above and other objects which will be apparent to those skilled in the art are achieved by the process described herein. Broadly, the present invention relates to a catalytic conversion process carried out in the presence of a solid, porous cracking catalyst which comprises subjecting a hydrocarbon charge, containing a contaminant which tends to deposit on the surface of said catalyst with concomitant undesirable effect on its cracking activity, to preliminary contact under catalytic cracking conditions with a continuously circulating body of solid particle-form adsorbent to effect deposition of the contaminant on the surface of said adsorbent and thereafter passing the charge stock having a substantially reduced content of contaminant into contact with cracking catalyst in a cyclic system wherein the catalyst is alternately employed in catalytic conversion and subsequent regeneration, controlling the accumulation of contaminant deposited on the surface of said adsorbent below an amount above which the conversion susceptibility of the hydrocarbon charge is adversely affected, continuously passing the particles of adsorbent through a separate zone wherein the surface contaminant is removed therefrom, and recycling the adsorbent particles substantially free of contaminant to contact with the hydrocarbon charge as aforesaid. It is also contemplated, particularly where an inexpensive adsorbent is employed, to continuously discard all or a portion of the adsorbent after use in removing contaminant during the preliminary contact stage and replace the same with fresh adsorbent. In such instance, as will be realized, it is unnecessary that surface contaminant be removed from the spent adsorbent.

One embodiment of the invention comprises a catalytic conversion process wherein a hydrocarbon charge containing metal contaminant is brought into contact under catalytic cracking conditions with a moving compact bed of particle-form solid contact material consisting of a mixture of two species of particles, one of which is preferentially segregated toward the charge inlet region and which thus makes initial contact with the hydrocarbon charge. Such particles comprise a minor proportion of the solid adsorbent mixture and may or may not possess catalytic cracking activity. These particles are present in sufficient amount and are in contact with the hydrocarbon charge for a sufficient time to adsorb on their surfaces a major proportion of the metal contaminant from said charge before the latter comes into contact with the second species of particle comprising the mixture. The second species of particle comprising a major proportion of the mixture is a cracking catalyst and differs from the first particle species in at least one physical aspect which affords ready means of separating the particle mixture after use in hydrocarbon conversion. The mixture of spent particles is thereafter separated into its respective species. The species containing adsorbed metal contaminant is separately treated to remove the exterior surface thereof in which the metal contaminant predominates and recycled for further use in said compact bed. The species employed as cracking catalyst is separately regenerated by burning coke therefrom in an oxidizing atmosphere and recycled to said compact bed for further use in hydrocarbon conversion.

In another embodiment of the invention, the adsorbent particles with which the hydrocarbon charge containing metal contaminant makes initial contact are maintained in a vessel or zone mechanically separated from the main body of cracking catalyst. In such embodiment, two separate cyclic systems are employed. One system comprises a continuously moving compact bed of solid particle-form adsorbent which may or may not possess catalytic cracking activity. The hydrocarbon charge is introduced into such moving bed maintained at catalytic cracking conditions, the ratio of oil to adsorbent and the residence time being sufficient to insure that a substantial amount and preferably a major proportion of the initial content of metal contaminant contained in the oil charge is adsorbed on the surface of the particles comprising the moving bed. The oil of substantially reduced metal content thereafter passes into the second cyclic system in which a continuously moving body of cracking catalyst is maintained under catalytic cracking conditions. The adsorbent particles, having adsorbed metal contaminant deposited on their surfaces, are conducted to a separate zone of the first cyclic system in which the surface metal contaminant is removed from the adsorbent particles by subjecting them to surface abrasion or to suitable chemical treatment, for example, exposure to hydrofluoric acid, which serves to remove the outer surface layer of the adsorbent particles in which the metal contaminant is concentrated. The adsorbent particles substantially freed of deposited metal contaminant are then returned in the cyclic system to further contact with fresh metal-contaminated hydrocarbon charge. The cracking catalyst in the second cyclic system may be either in the form of a particle-form compact moving mass made up of particles of approximately 4–30 mesh (Tyler) size or in the form of a fluidized mass of finely divided particles, for example, those of 50–400 mesh (Tyler) size. The cracking catalyst after use in hydrocarbon conversion is passed into a regeneration zone in which coke is burned from the catalyst particles in an oxidizing atmosphere, such as air, in the conventional manner and the regenerated catalyst particles are returned for further use in cracking the hydrocarbon charge which has undergone preliminary contact with the adsorbent particles as described above during which a substantial proportion of initial metal contaminant is removed therefrom. In this embodiment, since the moving bodies of adsorbent and cracking catalyst are separated by mechanical means, it is not necessary that they differ in at least one physical characteristic. Thus, it is contemplated that in such embodiment the particles used primarily as adsorbent and the particles used as the main cracking catalyst may be of different chemical and/or physical properties or may be identical. In the latter instance, it is to be expected that some catalytic cracking will take place during the preliminary contact step. However, such cracking, while desirable under certain conditions, is considered incidental to the principal function of the preliminary adsorbent contact which is to remove a substantial and preferably a major proportion of metal contaminant from the hydrocarbon charge stock before the latter comes into contact with the principal body of cracking catalyst wherein most, if not all, of the desired catalytic conversion is effected.

It is essential to the success of the present process that the temperature conditions prevailing in the preliminary contact zone be those of catalytic cracking, i.e. temperatures of about 800° F. to about 1200° F. and pressures of atmospheric or greater. At ordinary temperatures, the extent of metal contaminant adsorbed from the hydrocarbon oil is very slight as compared with amount of metal removed at the higher temperatures specified above.

As adsorbent in the preliminary contact zone, it is contemplated that any suitable solid, porous adsorbent may be used upon which the contaminant in the oil is deposited and which is susceptible to subsequent treatment to remove the accumulated surface contaminant therefrom. Thus, representative adsorbents include porous clays, inorganic oxide gels, porous precipitates, activated carbon, etc. The porous adsorbent may be catalytically inert or may possess catalytic activity. For reasons pointed out hereinbelow, however, it is preferred to employ silica gel as the adsorbent in the preliminary contact zone. The adsorbent is utilized in particle-form. Where the adsorbent is subjected to subsequent removal of surface contaminant, it will generally have an initial particle size of 1 to 30 mesh (Tyler). As will be realized, the particle size of the adsorbent particles decreases after each cyclic treatment in which the surface layer having adsorbed metal contaminant is removed. When the size of the adsorbent particle decreases to an extent where further treatment thereof to remove adsorbed metals becomes impractical or uneconomical, it is discarded and replaced by fresh adsorbent. Generally, it has been found that when the particle size of the adsorbent is less than about 40 microns in diameter, it is suitably removed from the system and replaced by fresh adsorbent. In those instances where the adsorbent after preliminary contact with the charge is continuously removed and replaced by fresh adsorbent, particles of widely varying size may be used, including those of the aforementioned particle size range as well as very finely divided, for example, fluidized adsorbent.

The contaminant accumulating on the surface of the adsorbent particles may be removed by grinding off the outer particle surface. Such grinding may be effected by agitating the particles in contact with a hard surface, such as the walls of the containing vessel or in the presence of hard, inert materials, such as metal particles, pieces of Carborundum, glass, porcelain, or other refractory materials. The particles may also be contacted with moving abrasive surfaces, such as by passing a stream of the contaminant-containing particles through two closely spaced rotating grinding wheels. It is particularly preferred in the cyclic system to employ a lift wherein the adsorbent particles containing contaminant are conducted in an inert gaseous atmosphere, for example, air, supplied under a pressure sufficient to recycle the adsorbent particles to the contacting bed. During the course of passage through the lift, the contaminated particles have their outer surfaces removed by abrasion of one particle striking another as well as by the particles hitting the walls of the lift chamber. Chemical means may also be used to remove the poisons from the outer surfaces of the adsorbent particles. Thus, suitable dissolving or solvent media, either gaseous or liquid, may be brought into contact with the particles containing contaminant; for example, the adsorbent particles may be exposed to hydrofluoric acid for a period of time sufficient to remove the outer surface layers in which the metal contaminant is concentrated. The particles so treated are thereafter suitably water-washed and dried before returning to the preliminary contacting bed. The method described in my copending application Serial No. 478,480, filed December 29, 1954, now U.S. 2,856,367 issued October 14, 1958, may also be effectively used for removing surface contaminant. Such method involves bringing the solid adsorbent particles into contact with molten wax under conditions such that the molten wax penetrates into the pores of the adsorbent to at least a depth corresponding to the amount of peripheral material to be removed, removing the porous solid from contact with the molten wax, effecting solidification of the wax contained in the pores of the adsorbent, contacting the adsorbent containing solidified wax with a polar wax-solvent for a period of time sufficient to dissolve wax from the pores thereof to the depth of peripheral material to be removed and thereafter drying the absorbent, whereby the outer surface thereof is removed as a finely divided powder without adverse effect on the remainder of the porous solid.

The extent of surface removal of the adsorbent particles by either chemical or physical means during each cycle will be sufficient to rid the adsorbent of a major proportion of the previously adsorbed metal contaminant. It has been found, in carrying out the process of this invention, that the total amount of metal accumulated on the surface of the adsorbent particles and present in the reactor must be maintained below a certain maximum. The maximum amount of metal thus present in the reactor should be kept below 100 parts per million based on weight of catalyst in the reactor. Although an adsorbent containing a greater concentration of metal contaminant may be effective in removing still further quantities of metal poison from the charge stock, the presence of metal contaminant in excess of the above-stated maximum has an adverse effect on the subsequent conversion susceptibility of the hydrocarbon charge. Thus, it has been established that metal contaminant acts directly on the hydrocarbon charge, diverting some of it which would normally be converted to gasoline to other products. Also, the presence of metal poison on the catalyst modifies the vapor composition of the charge so as to effect a lower gasoline yield than obtainable from the normal unpoisoned cracking catalyst. Accordingly, while pre-contacting the hydrocarbon charge with an adsorbent solid can prevent metal from reaching the main catalyst bed, such adsorption of metals does not in itself prevent poisoning of the hydrocarbon charge. It is necessary that the metal contaminant be removed from the adsorbent precontacting particles.

It has further been found that the poisoning effects of heavy metal on the hydrocarbon charge stock is dependent on the solid adsorbent upon which the metal is deposited. In this regard, it has been discovered that silica reduces the poisoning effect of metal contaminant on the hydrocarbon charge to a considerably greater extent than when the metal contaminant is similarly deposited on adsorbent particles of cracking catalyst. Thus, in comparable catalytic cracking runs employing a hydrocarbon charge of Light East Texas gas oil having a boiling range (ASTM) of 456–685° F. and utilizing a temperature of 850° F., a space velocity of 1.5, a catalyst to oil ratio of 4, employing atmospheric pressure, and, as the main cracking catalyst, a silica-alumina (approx. 10 wt. % $Al_2O_3$ and 90 wt. % $SiO_2$) cogel composite, and utilizing, in one example, a pre-contacting bed of a silica-alumina cracking catalyst containing as metal contaminant approximately 186 parts per million of nickel and, in the second example, a pre-contacting bed of silica gel containing a similar amount of nickel contaminant, the following cracking results were obtained:

| Run | Precontacting Adsorbent | Gasoline | Coke | Gas | Gas Gravity |
| --- | --- | --- | --- | --- | --- |
| | None | 46.3 | 4.2 | 10.0 | 1.60 |
| 1 | Silica-Alumina Cracking Catalyst Containing Nickel Contaminant | 42.5 | 5.0 | 11.9 | 1.32 |
| 2 | Silica-Containing Nickel Contaminant | 45.1 | 5.3 | 10.2 | 1.53 |

It is evident from the above results that, when the metal contaminant is contained on silica gel, considerably smaller losses in gasoline yield and gas gravity are realized and increase in gas production is avoided as compared with the case in which the metal contaminant is contained on cracking catalyst. As will further be noted, the coke produced is nearly identical for either case. The additional coke production obtained when metal contaminant was introduced was confined to the immediate vicinity of the metal itself. Thus, it was found that the additional coke make obtained upon cracking in the presence of nickel-bearing particles was confined to these particles. Accordingly, following the teachings of this invention, employing separate circulation and regeneration of the main cracking catalyst bed and of the pre-contact mass, it is contemplated that the burden of any additional coke make due to high metal feed conditions would fall on the pre-contact mass cyclic system and that the main body of cracking catalyst would operate under normal conditions of coke make and regeneration.

The reaction conditions employed for effecting hydrocarbon conversion, i.e., temperature, pressure, catalyst/oil ratio and the like form no part of the invention and are those normally used in catalytic cracking. Since these conditions are familiar to those skilled in the art, it is not considered necessary to describe them in detail. It is contemplated to use as cracking catalyst any of those materials known to the art as useful in catalytically converting heavy hydrocarbon oils to lighter fractions boiling in the range of gasoline. Merely by way of example, suitable cracking catalysts include various synthetic composites and various acid-treated clays. Thus, siliceous cracking catalysts have long been recognized as useful in catalytically promoting hydrocarbon conversion reactions. Such siliceous catalysts contain silica and one or more metal oxides. In clays, the metal oxide present is principally alumina. Active synthetic cracking catalysts are generally gels or gelatinous precipitates and include silica-alumina, silica-zirconia, silica-beryllia, silica-magnesia, as well as ternary combinations such as silica-alumina-magnesia, silica-alumina-zirconia, and silica-alumina-beryllia. Ordinarily, this type of catalyst contains silica and at least one material selected from the group of alumina, zirconia, beryllia, and magnesia. Other metal oxides may also be present, if desired, generally in small percentage, such as manganese, chromium, titanium, tungsten, molybdenum, and calcium. Suitable non-siliceous cracking catalysts include composites of alumina and boria. It will thus be understood that the catalysts utilized for cracking in the process of this invention may be any of the cracking catalysts heretofore customarily employed which are susceptible to poisoning by the presence of heavy metal contaminant in the hydrocarbon feed stock.

The nature of this invention may be more readily understood by a consideration of the various embodiments, refinements, and modifications thereof as illustrated in the attached drawings wherein:

Figure 1 shows in schematic form an apparatus wherein the pre-contact adsorbent is mechanically separated from the main bed of cracking catalysts and two separate cyclic systems are employed.

Figure 2 illustrates means for accomplishing segregation according to particle size of a mixture of two species of particles introduced into a reactor utilizing a compact moving mass of particle-form contact material.

Figure 3 illustrates an alternate means for effecting separation according to particle size of a mixture of two species of particles introduced into a reactor utilizing a compact moving mass of particle-form contact material.

Figure 4 shows a modified reactor scheme for introducing two species of particles to a reactor.

Turning now particularly to Figure 1, oil charge containing metal contaminant is introduced through inlet 10 to guard chamber 11 in which a circulating bed of adsorbent particles is maintained. The particles may be either catalytically inert or may possess catalytic cracking activity. For reasons noted above, adsorbent particles of silica gel are especially preferred. The guard chamber is provided in its lower section with a number of openings 12 which are sufficiently small as to prevent the passage of the adsorbent particles therethrough but large enough to permit the passage of oil in either liquid or vapor state from guard chamber 11 to the reactor 13, after the charge has undergone preliminary contact with the adsorbent. The particles in chamber 11 with metal contaminant adsorbed on their surface are circulated through conduit 14 to kiln 15 in which coke is burned from the particles. The adsorbent particles thereafter pass through conduit 16 to the lower portion of lift 17 in which the particles flow upward under the influence of a high pressure gas stream. During passage of the particles through lift 17, they are subjected to surface abrasion as a result of the particles striking one against the other as well as against the walls of the lift. The fines removed as a result of such abrasion contain the major portion of previously adsorbed metal contaminant. The resultant mixture of fines and adsorbent particles pass from the air lift to separator 18 in which the fines are removed through outlet 19. The separated adsorbent particles, substantially free of metal contaminant and having a renewed surface as a result of being subjected to abrasion, are recycled through conduit 20 to guard chamber 11 for re-use. Reactor 13 contains particle-form cracking catalyst and the oil, upon coming into contact with such catalyst, undergoes conversion to lighter material boiling in the gasoline range. Vaporous products may be removed through outlet 21. The spent cracking catalyst passes from the reactor to kiln 22 wherein coke is burned from the catalyst particles in the usual manner. The regenerated catalyst passes through conduit 23 to air lift 24 and is thus recycled to reactor 13 through pipes 25.

It is contemplated that the guard chamber utilized in the above operation will ordinarily occupy only a small fraction of the reactor volume. Thus, for example, the first 1/20 of the reactor volume may be occupied with adsorbent particles. In this case, the metal will be concentrated twenty-fold on these particles as compared to the concentration when metal contaminant is distributed over the entire catalyst charge. Providing .2 ton per day attrition rate in the pre-contact mass cyclic system would under the foregoing circumstances be equivalent to 10 tons per day of fresh catalyst replacement to lower the metals content of the unit. Moreover, in the above operation, the metals concentration of the cracking charge can be controlled at will by changing the circulation rate and thus the abrasion rate of the adsorbent particles in the pre-contact cyclic system. In addition, it is contemplated that in the case of liquid feed, the separate circulation of the pre-contact particles may allow flexible control of the catalyst temperature for optimum vaporization conditions and may aid in preventing temperature gradients, which result in performance losses, from propagating through the reactor.

Referring now to the embodiment shown in Fig. 2, adsorbent particles of larger particle size than the cracking catalyst are employed as the pre-contact mass. The adsorbent particles enter reactor 30 through pipe 31. Cracking catalyst particles enter the reactor through pipe 32 which is of smaller diameter and concentric with pipe 31. The adsorbent pre-contact particles thus form a bed overlying the main bed of cracking catalyst and make initial contact with the oil charge entering the reactor through inlet 33. Metal contaminant is adsorbed from the oil charge on the surface of the adsorbent particles. The oil thereafter undergoes catalytic conversion to materials boiling in the gasoline range. Spent adsorbent and catalyst particles are withdrawn from the reactor through outlet 34, regenerated in an oxidizing atmosphere in conventional manner and thereafter recycled preferably through an air lift in which metal contaminant concentrated on the surface of the adsorbent particles is removed by abrasion. The particles of adsorbent and cracking catalyst thereafter pass through conduit 35 to separator 36 which serves to segregate the larger adsorbent particles from the smaller cracking catalyst particles. The latter emerge from the separator through pipe 32 and re-enter the reactor. The larger adsorbent particles pass from separator 36 through conduit 37 to pipe 31 and thus re-enter the reactor.

The adsorbent particles employed in the above embodiment, while of differing particle size, may be of the same composition as the cracking catalyst particles. Preferably, however, the adsorbent particles are characterized by a hardness less than that of the cracking catalyst particles so that, in mutual grinding, attrition will preferentially abrade the metal-bearing particles of adsorbent. Thus, in the above operation, clay pellets of lesser hardness and larger particle size than synthetic particles of cracking catalyst are suitably employed as the adsorbent pre-contacting mass.

In Fig. 3, the feed system introducing solid porous particle-form contact material into reactor 40 consists of two concentric pipes. A mixture of two types of solid, porous particles are conducted through the feed pipe to the reactor to form a moving compact bed of particle-form contact material. Hydrocarbon charge stock is introduced through inlet 41. The compact moving bed is composed of one species of solid, porous particles present in minor proportion which may or may not exhibit catalytic cracking activity and a second species of solid, porous particles present in major proportion which is catalytically active in cracking hydrocarbons. The outer pipe 42 of the feed system serves to introduce particles of large size which preferentially adsorb metal contaminant, while the inner pipe 43 extending beyond the end of pipe 42 and jutting further into the reactor supplies the bulk of the cracking catalyst of relatively smaller particle size. The particles, while differing in particle size, may be of identical composition. Preferably, however, the second species of particles is characterized by greater hardness and smaller particle size than the first species. Thus, the second species is suitably a synthetic cracking catalyst such as a silica-alumina composite and the first species, present in minor proportion, say 25 percent of the total solid volume, is suitably pelleted clay having a particle size in excess of that of the synthetic cracking catalyst. The metal-contaminated charge stock entering the reactor accordingly contacts the layer of larger particles overlying the main body of cracking catalyst. Metal contaminant contained in such stock is thereby largely adsorbed on the larger adsorbent particles, thus affording protection against metal poisoning of the cracking catalyst particles.

When clay pellets are used as the adsorbent medium, the present embodiment also makes use of the relatively greater surface grinding rate to which the softer clay pellets are subjected relative to harder synthetic cracking catalyst in circulating through the system. Thus, in the course of natural catalyst attrition, the particles which were preferentially subjected to metal deposition within their surfaces are preferentially freed from metals by the mechanism of natural grinding with other particles and solid construction materials. In this embodiment, processes accompanying circulation of solid particles serve as the means to accomplish increased metals rejection in the system. At the bottom of the reactor, solids are preferably, although not necessarily, withdrawn through separate pipes near the center and near the periphery of the reactor. Due to flow characteristics of the contact moving mass through the reactor, particles of small size, i.e., cracking catalyst particles, are withdrawn through outlet pipe 44 positioned near the center of the reactor, while particles of larger size, i.e., adsorbent particles, are withdrawn through outlets 45 located near the periphery of the reactor. These separate fractions are separately regenerated in the conventional manner and recycled to the respective feed pipes. Additional means for size separation may be employed between the withdrawal from and refeeding to the reactor in addition to or instead of withdrawal at separate locations. Such separation may also take place after a common step or steps of processing, such as regenerating in a kiln, and before reentering the reactor through separate feed pipes, or such separation may be an intimate part of the intervening processing.

In Fig. 4, a modified reactor scheme is shown in which a definite particle flow pattern is relied upon to provide preferential and initial exposure of one particle species to the flow of charge stock. Hydrocarbon charge is fed to reactor 50 through conduit 51 to the top of a confined dome-like but communicating portion of the reactor into which adsorbent particles are introduced through conduit 52. The adsorbent particles serve to remove a major portion of metal contaminant from the hydrocarbon charge before the latter comes into contact with cracking catalyst particles introduced into the reactor through conduits 53. Natural inter-particle grinding may again be relied upon as means for removal of surface metal contaminant from the adsorbent by providing for it particles of relatively lower hardness compared to the particles of cracking catalyst. Otherwise, artificial means of metal removal from the adsorbent particles may be employed, in which case the particle species necessarily differ in at least one physical property such as hardness, particle size, density, etc. Also, for example, ferromagnetic materials may be included within the particles of one of the species and magnetic means of separation employed.

The metals contained in petroleum oil increase in concentration with the boiling point of the constituents in which they are contained. Consequently, metal poisoning becomes a particularly severe problem when feed stocks are employed which have boiling points near or in excess of the temperature employed in the cracking process. It is therefore particularly desirable that the liquid feed stock be subjected to preferential metals adsorption in accordance with the process of the invention. When mixed feed stock is employed, it is possible to process only the liquid feed portion, following the teachings of this invention, while the vapor feed may be conducted to the main catalyst bed directly. Thus, it is contemplated that utilizing a mixed feed the liquid portion may be sprayed directly on the particles of adsorbent to remove metal contaminant therefrom while the vapor portion of the feed enters the reactor at a point at which it contacts the main bed of cracking catalyst.

It is further contemplated in the various embodiments of this invention to achieve removal of the metal contaminant by continuously or periodically discarding a portion or all of the adsorbent particles without recirculation and re-use. Thus, fines resulting from passage of the cracking catalyst through the reactor, after separation from the main body of cracking catalyst, may be continuously recycled to a confined zone for use as the preliminary contact adsorbent, and subsequently discarded and replaced by freshly formed fines. It is believed that porous adsorbent particles are efficiently capable of adsorbing metal contaminant until their porosity is markedly reduced by coke deposits. Under usual conditions of operation, such will not occur until after a contact time more than ten times that of the contact time between the oil and cracking catalyst particles. Thus, the throughput rate of the adsorbent metal screening particles may be much less than $\frac{1}{10}$ and quite conceivably $\frac{1}{100}$ or less of the catalyst circulation rate. Especially in units employing only vapor feed, coke formation rates within such particles are ordinarily small enough to allow a particle throughput much less than $\frac{1}{100}$ of the catalyst circulation rate. Furthermore, as noted hereinabove, the adsorbent particles need not be catalytically active so that discarding of a quantity defined by the above small throughput rate of an inexpensive catalytically inactive material, such as a clay, is economically feasible.

It is to be understood that the above description is merely illustrative of preferred embodiments of the invention, of which many variations may be made by those skilled in the art without departing from the spirit thereof.

I claim:

1. A process for converting, in the presence of a solid porous cracking catalyst, a hydrocarbon oil containing a metal contaminant selected from the group consisting of nickel, copper and vanadium that tends to deposit on the surface of said catalyst with concomitant undesirable effect on its cracking activity which comprises contacting said oil under catalytic cracking conditions with a moving compact bed of particle-form solid contact material consisting of a mixture of two species of particles, one of which, present in minor amount and having adsorbent properties, is preferentially segregated so as to make initial contact with said oil and adsorb a major proportion of said metal contaminant therefrom before the oil comes into contact with the second species of particles present in major amount and comprising a cracking catalyst differing in particle size and having a hardness greater than that of the first particle species whereby, as a result of mutual grinding during movement of the particles comprising said compact bed, attrition preferentially abrades the metal-bearing surfaces of particles of the first species, controlling the residence time between the oil charge and first particle species so that the amount of metal contaminant accumulating on the surface of said species does not exceed about 100 p.p.m. based on weight of said second particle species, controlling the residence time between the oil and said second particle species to effect catalytic cracking of the oil, removing the mixture of particles from contact with the oil, separating said mixture into (1) particles of the first species, (2) fines of said species characterized by high content of said metal contaminant and produced during the aforesaid mutual grinding and, (3) particles of the second species, discarding said separated fines, regenerating the separated particles of the second species in an oxidizing atmosphere and recycling the same after regeneration together with said separated particles of the first species to said moving compact bed under conditions such that the first of said species is preferentially segregated to make initial contact with the oil charge.

2. The process of claim 1 wherein the particles of the first species are clay and the particles of the second species are a synthetic cracking catalyst.

3. The process of claim 1 wherein the particles of the first species are clay and the particles of the second species are synthetic silica-alumina cracking catalyst.

References Cited in the file of this patent

UNITED STATES PATENTS

| | | |
|---|---|---|
| 2,441,170 | Rose et al. | May 11, 1948 |
| 2,462,891 | Noll | Mar. 1, 1949 |
| 2,549,518 | Perry | Apr. 17, 1951 |
| 2,598,309 | Say et al. | May 27, 1952 |
| 2,651,600 | Taff et al. | Sept. 8, 1953 |
| 2,689,825 | McKinley | Sept. 21, 1954 |
| 2,767,126 | Rice | Oct. 16, 1956 |